United States Patent
Bittner et al.

[11] Patent Number: 5,080,881
[45] Date of Patent: Jan. 14, 1992

[54] METHOD OF PREPARING LOWER SODIUM POLYSULFIDES FROM HIGHER SODIUM POLYSULFIDES AND SODIUM

[75] Inventors: Friedrich Bittner, Bad Soden; Walter Hinrichs, Bruehl; Herbert Hovestadt, deceased, late of Erftstadt, by Maria Hovestadt, executor; Ludwig Lange, Bruehl; Erich Splett, Huerth-Berrenrath, all of Fed. Rep. of Germany

[73] Assignee: Degussa Aktiengesellschaft, Frankfurt am Main, Fed. Rep. of Germany

[21] Appl. No.: 405,864

[22] Filed: Sep. 11, 1989

[30] Foreign Application Priority Data

Sep. 17, 1988 [DE] Fed. Rep. of Germany ....... 3831737

[51] Int. Cl.⁵ .................. C01B 17/34; C01B 17/22
[52] U.S. Cl. .................................. 423/562; 423/566.2
[58] Field of Search ............... 422/231, 225; 423/196, 423/562, 566.2

[56] References Cited

U.S. PATENT DOCUMENTS 3,034,859  5/1962  Gunn et al. .................... 422/225
4,640,832  2/1987  Bittner et al. .................. 423/565

Primary Examiner—Gary P. Straub
Assistant Examiner—Timothy C. Vanoy
Attorney, Agent, or Firm—Beveridge, DeGrandi & Weilacher

[57] ABSTRACT

Methods for the preparation of lower sodium polysulfides such as sodium disulfide from higher sodium polysulfides and sodium. To this end, either molten sodium polysulfide placed in a receiver is reacted with sodium in a stoichiometric ratio corresponding to the desired product under vigorous agitation and under protective gas or the higher polysulfide and the sodium are dosed into a polysulfide melt in a receiver under the same conditions either alternatively or simultaneously. In all instances, the dosing of the sodium is set so that the reaction mixture remains capable of being agitated and the agitation is continued until the desired product composition has been achieved.

11 Claims, 1 Drawing Sheet

METHOD OF PREPARING LOWER SODIUM POLYSULFIDES FROM HIGHER SODIUM POLYSULFIDES AND SODIUM

INTRODUCTION AND BACKGROUND

The present invention relates to a method of preparing pure sodium polysulfides directly from higer sodium polysulfides and sodium.

DE-PS 34 36 698 teaches a method of preparing sodium polysulfides, especially sodium tetrasulfide $Na_2S_4$ and a polysulfide of the stoichiometric composition $Na_2S_3$ from elements sodium and sulfur. It is said that the products are in very pure form and absolutely free of water and solvent. The prior art method is carried out by dosing sodium and the sulfur in a stoichiometric ratio corresponding to the desired polysulfide under a protective gas in alternating fashion into a prepared melt of a polysulfide. Vigorous agitation is used during the dosing operation. The portions are measured in such a manner that when the sodium is added, the reaction mixture remains in the state of an agitatable suspension, even if lower polysulfide intermediate products are formed which are present in the polysulfide melt in heterogenous phase. When the sulfur is added, the latter is allowed to react completely to a polysulfide of a higher sulfur content.

The particular polysulfide that is formed in this method thus depends on the particular setting of the stoichiometric ratio in the alternating charging of the reactants. The extremely vigorous reaction of the pure elements with one another is somewhat reduced, for example, in a preparation of sodium tetrasulfide by not bringing the sodium into direct contact with the elementary sulfur. Instead, the sodium is added in small partial amounts and in a thin jet stream into a vigorously agitated tetrasulfide melt heated to approximately 300° C. (melting point $Na_2S_4=285°$ C.). As a result, intermediate, lower polysulfides, e.g. of the stoichiometric compositon or empirical formula $Na_2S_3$ or $Na_2S_2$ and other polysulfides with higher melting points, are formed. These are reconverted back into the desired polysulfide, that is, $Na_2S_4$ by post-charging of the required partial amounts of sulfur.

However, the alternating charging of the elements sodium and sulfur into the polysulfide turned out to be relatively time-consuming and labor-consuming in this known method. German patent application P 38 03 243, now U.S. Ser. No. 07/303,029 filed Jan. 30, 1989, assigned to the same assignee as the present application, describes a solution of this problem. The improved method provides that the sodium and the sulfur are delivered simultaneously in molten form to spatially separate locations of a cylindrical reactor whose diameter is dimensioned so that a reliable separation of the reaction zone between sodium and polysulfide from the reaction zone between sulfur and polysulfide is assured. The sulfur is added outside the reaction zone between sodium and polysulfide and in the agitated current as far as possible in front of the addition point for the sodium.

Both older methods share the common feature that sodium and sulfur are added to a melt, functioning as reaction medium, of a polysulfide obtained in a small amount by the direct reaction of sulfur with sodium in the desired stoichiometric ratio with alternating or simultaneous dosing.

Since a need was felt or perceived in practice to process higher polysulfides which had already been produced and stored or which stemmed from spent sodium/sulfur batteries into polysulfides with a defined, lower sulfur content, the industry has sought a simplified method for this purpose.

Another need arose regarding a solution for the handling of sulfur, which i critical on account of the high work temperatures in the preparation of disodium disulfide $Na_2S_2$ (>450° C. ).

SUMMARY OF THE INVENTION

The present invention provides three independent routes for a solution to the above noted needs, which will employ a unified principle. That is, a feature of the present invention which is distinctly different from methods which use elemental sulfur and sodium, resides in placing the polysulfide functioning as an initial material into a receiver for reaction with the subsequent addition of sodium. The process can also be carried out by an alternating or simultaneous addition of initial material and sodium into a reactor vessel containing a melt of a polysulfide which preferably has the composition of the desired final product.

In more particular detail, one embodiment of the invention, Method I, resides in a method of preparing lower sodium polysulfides from higher sodium polysulfides and sodium which is carried out by placing the higher sodium polysulfide in molten form under a protective gas into a receiver for the reaction. The sodium is then dosed into the melt in a stoichiometric ratio corresponding to the desired polysulfide final product. Vigorous agitation is used in this method in such amounts that the reaction mixture remains in a state of agitatable suspension and the agitation is continued until the product has been completely formed.

In a second embodiment of the invention, Method II, for preparing lower sodium polysulfides from higher sodium polysulfides and sodium, the reaction is also conducted under a protective gas in a stoichiometric ratio corresponding to the desired polysulfide in a melt of polysulfide in a reaction vessel under vigorous agitation. In mehtod II, the higher polysulfide and the sodium are dosed into the melt alternatingly in portions which are measured in such a fashion that the reaction mixture remains in a state of agitatable suspension when the sodium is added. When the polysulfide is added, the latter is allowed to react to form the polysulfide product with the desired sulfur content.

In the third embodiment of the invention, Method III, the lower sodium polysulfides are prepared from higher sodium polysulfides and sodium also by means of reaction under protective gas in a stoichiometric ratio corresponding to the desired polysulfide in a melt of a polysulfide in a receiver. In this embodiment, however, the higher polysulfide and the sodium are supplied simultaneously at spatially separate points into a cylindrical reactor. The diameter of the reactor is dimensioned so that a reliable separation is assured between the zone in which the reaction between sodium and the polysulfide melt takes place and the zone in which the higher polysulfide is added. The higher polysulfide and the sodium are used in such amounts that the reaction mixture remains in the state of an agitatable suspension. As a result, the addition of the higher polysulfide takes place outside of the zone of reaction between sodium and the polysulfide melt and in the agitated stream as far as possible away from the addition point for the sodium.

In this process, the agitation is continued until the desired polysulfide product has been completely formed.

A further feature of the invention resides in maintaining the temperature of the melt placed in a receiver in a range of 300°-600° C. by the speed of the addition of sodium and/or by the removal of heat. More particularly, during the preparation of $Na_2S_2$ the temperature of the melt in the receiver is 450°-600° C., while during the preparation of $Na_2S_3$, the temperature is in the range of 350°-400° C. and for $Na_2S_4$, the temperature range is 300°-350° C.

Further aspects of the invention include carrying out the reaction in a reactor made of selected materials. Thus, for those reactor parts which come into contact with the melt for the production of $Na_2S_4$ and $Na_2S_3$ the parts are preferably formed of aluminum alloys, especially $AlMg_3$ or AlMn or $Al_2O_3$ or greasy carbon. In reactors used for the production of $Na_2S_2$, the parts coming into contact with the melt should consist of glassy carbon or ceramic, especially of $Al_2O_3$, $SiO_2$ or SiC or graphite or are jacketed or coated with these materials.

The method of the invention employs a protective gas which is preferably an inert gas, especially argon. In carrying out the embodiments identified above as Methods II and III, the sodium and the higher polysulfide are dosed into the melt in molten form or in solid form.

With regard to the embodiment identified above as Method III, the sodium is delivered to the melt in the receiver by introducing the sodium into the circulating flow created by the centrally located agitator mechanism in the reactor outside of the thrombus area (non-thrombus area) and a full jet stream of the higher polysulfide exiting from a nozzle is delivered into the melt in the region of the melt where the thrombus takes place.

Preferably when carrying out Method III, the sodium nozzle is bathed with the protective gas to protect against sulfur vapors and polysulfide aerosols. A ball valve which can be located under the nozzle and with a flowthrough section that is a multiple of the diameter of the full sodium jet stream is closed after termination of the delivery of sodium.

Method I permits the use of simplified apparatus means because the total amount of product to be modified in accordance with the invention is placed in a reaction tank receiver all at once. e.g. as a solid, and can be melted in the reactor itself. Therefore extensive apparatus for the melting and liquid dosing of sulfur which are indispensable in conventional methods can be eliminated. Losses due to vaporization of sulfur are eliminated. The simplifying of the apparatus is very favorable, especially in the preparation of $Na_2S_2$, since all apparatus parts must consist of especially melt-resistant materials on account of the high melting point of this compound.

Methods II and III are flexible as regards the chemical composition of the polysulfide to be placed in the reaction vessel. Thus, for example, $Na_2S_2$ placed in a receiver for preparing $Na_2S_2$ can be reacted with polysulfides of the compositions $Na_2S_3$ to $Na_2S_5$ and sodium. Alternatively, in order to prepare $Na_2S_3$, either $Na_2S_3$ placed in a receiver can be reacted with $Na_2S_4$ or $Na_2S_5$ and sodium or $Na_2S_2$ placed in a receiver can be reacted with $Na_2S_4$ or $Na_2S_5$. A considerable advantage results thereby in that no narrow temperature limits must be observed for the melting and liquid dosing of the polysulfide to be added to the starting material in the reactor receiver as is the case in conventional methods.

In addition to these advantages, there is the considerable advantage, especially in method III, that the possibility of entraining freshly dosed-in sulfur from its point of introduction into the area of the addition of sodium is eliminated.

BRIEF DESCRIPTION OF THE DRAWINGS

The present invention will be further understood with reference to the drawings, wherein.

DETAILED DESCRIPTION OF THE INVENTION

Figure 1:
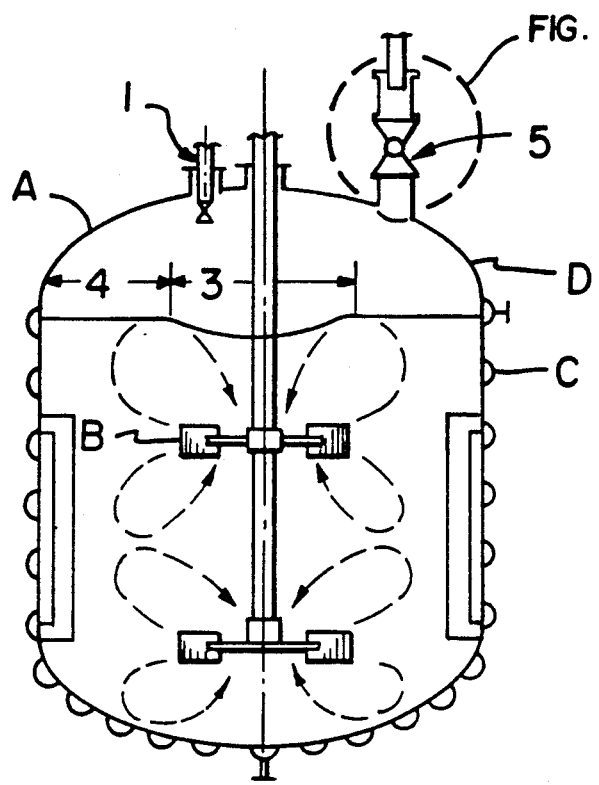
FIG. 1 is a schematic elevation view of the reactor used for the present invention.

Described in further detail, FIG. 1 shows a reaction vessel (A) fitted with a paddle agitator (B) and jacketing means (C). Through the top cover (D) of the vessel (A), there is connected a charging means (1) for the charging of polysulfide. Sodium is introduced through nozzle (2). Below the nozzle (2), there is a ball valve (5) permitting control of the charging of the sodium. The arrows around the paddle agitator (B) show the flow pattern and illustrate the thrombus area (3) and the non-thrombus area (4). The apparatus illustrated is conventional.

Figure 2:
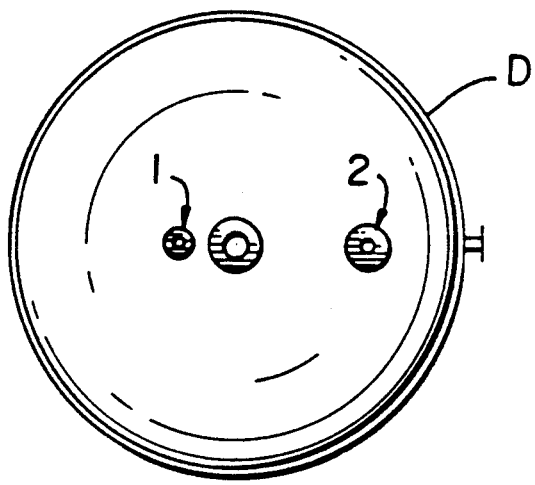
FIG. 2 is a top view of the reactor.

FIG. 2 shows the top view of the cover (D) fitted with connections (1) and (72) for charging the polysulfide and sodium, respectively.

Figure 3:
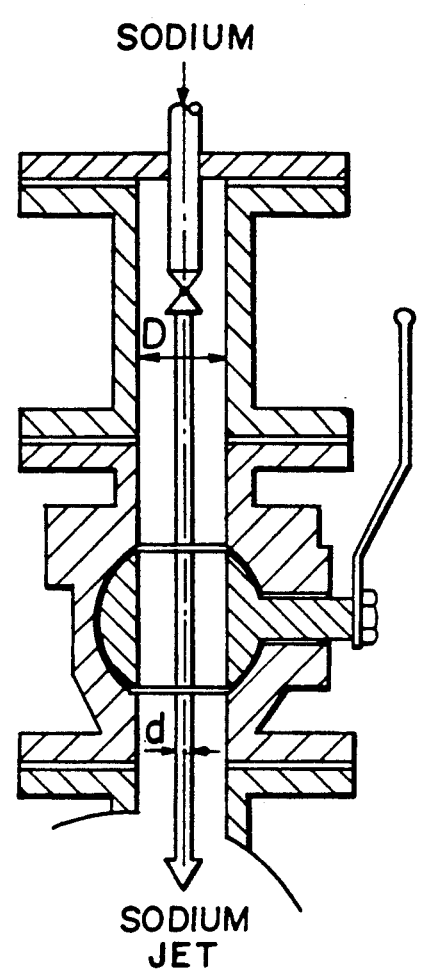
FIG. 3 is a cross-sectional elevation view of the ball valve mechanism useful for the present invention.

FIG. 3 shows the details of a ball valve mechanism found to be useful in controlling the charging of sodium into the non-thrombus area in the reaction vessel.

The invention will be explained in more detail below with reference to the examples of method and of apparatus, which is equally well suited for the preparation of $Na_2S_4$, $Na_2S_3$ and also of a polysulfide of the stoichiometric composition $Na_2S_2$, as well as by three method examples for the performed perparation of the compound $Na_2S_2$.

METHOD I: PREPARATION OF $Na_2S_2$ FROM $Na_2S_4$ BY MEANS OF CHARGING WITH SODIUM

A laboratory reactor of V2A with strong, level bottom plate was jacketed with a ceramic crucible of $Al_2O_3$ resistant to the reaction medium. The flanged cover of V2A was provided with a screwed-in connecting piece for filling in sodium, with an introductory tube ending under the cover for the protective gas argon, with a temperature-sensor protective tube of $AL_2O_3$ and with a packing box each for running through the shaft of a vane agitator of graphite as well as of a height-adjustable, angled emptying tube of $Al_2O_3$ which could be closed on the end by a plug of asbestos. All reactor parts coming in contact with the melt thus consisted of said melt-resistant materials $Al_2O_3$ and graphite. At an inside width of 13 cm and a height of likewise 13 cm, the reactor was capable of receiving a maximum of 1.5 liters, corresponding to approximately 3 kg, melt.

Prior to the start of the batchwise production, the reactor, which stood on an electric plate with infinitely variable heating and was heat-insulated on its jacket, was filled with 2 kg of $Na_2S_4$ melt heated to approximately 350° C. The closed reactor was under an argon pressure of approximately 50 Pa. Prior to the opening of the filling connection, the argon flow was slightly increased to prevent the penetration of air and the liquid sodium heated to approximately 110° C. was sprayed in small portions of approximately 3 g with a glass pipette.

As a result of the portion-by-portion addition of sodium and of the additional heating of the laboratory reactor with the aid of the electric heating, the temperature in the reactor was elevated to a maximum of 600° C. which is above the melting temperature of the $Na_2S_2$ of 445° C. A timely turning-off of the additional heating during the dosing-in peration of sodium assured that the reactor temperature never rose above 600° C. in spite of the exothermal reaction.

During the portion-by-portion charging of the sodium amount of 0.527 calculated for converting the 2 g $Na_2S_4$ melt in the receiver, the agitation speed was 200 rpms. It was able to be reduced to 100 rpms in the succeeding approximately 2 hours for dissolving the $Na_2S$ grit produced as an intermediate. The closed reactor was set during this time back under an argon pressure of approximately 50 Pa.

After the above-mentioned 2 hours "postreaction", sample material was removed for analysis by introducing an $AlMg_3$ pipette into the homogeneous melt. It was determined that a postcharging of sodium or of $Na_2S_4$ is necessary only infrequently.

In order to remove the reaction product, the removal tube of the reactor was lowered through the packing box until it achieved a location of approximately 3–4 cm over the bottom of the reactor. The shank of the removal tube passes down freely over the reactor cover and was heated by an electric band to approximately 600° C. The reactor was partially emptied after opening of the tube by elevating the inner pressure via the argon line, except for a residual amount of 1.162 kg which serves as starting material for the next charge.

The outflowing melt (1.365 kg) was trapped in an uncovered, flat, cold pan of 20×30 cm bottom area under an atmosphere of argon and allowed to solidify.

| Calculation of amount - Method I | |
| --- | --- |
| Starting material in receiver | = 2 kg $Na_2S_4$ |
| Addition of sodium | = 0.527 kg Na |
| Production | = 2.527 kg $Na_2S_2$ |
| Product removal | = 1.365 kg $Na_2S_2$* |
| Remainder (starting material for next charge) | = 1.162 kg $Na_2S_2$ |

*Analysis
41.74% Na (theor. 41.76% Na)
8.28% $S_{molten}$ (theor. 58.24% $S_{molten}$)

METHOD II: PREPARATION OF $Na_2S_2$ BY MEANS OF THE ALTERNATING CHARGING OF SODIUM AND $Na_2S_4$

Prior to the start of the batchwise production, the laboratory reactor described in detail under Method I was filled with 1.162 kg of the $Na_2S_2$ residual melt with a temperature of approximately 550° C. and obtained according to method description I. Prior to the opening of the filling connection, the flow of argon was slightly amplified to prevent the penetration of air and the sodium, heated to approximately 110° C., was sprayed in using small portions of approximately 3 g with a glass pipette.

After the completed addition of approximately 30 g sodium at first, the weighed amount of solid $Na_2S_4$ equivalent for the formation of the desired lower polysulfide was added in the form of pellets via a funnel set on the sodium filling opening. Thereafter, 30 g sodium were charged in again and the cycle was repeated.

The agitation speed was 200 rpms during the portion-by-portion charging of 0.289 kg sodium, total, and the amount of 1.095 kg sodium tetrasulfide calculated for obtaining of the desired sodium disulfide. This agitation speed was able to be reduced to 100 rpms in the succeeding approximately 2 hours for dissolving the sodium monosulfide grit produced as intermediate. The closed reactor was placed under an argon pressure of approximately 50 Pa again during this time.

A throttling of the heating during the dosing in of sodium and $Na_2S_4$ assured that the reactor temperature never rose above 600° C. in spite of the exothermal reaction. After said 2 hours of postreaction, sample material was removed for analysis. An $AlMg_3$ pipette was therefore introduced into the homogeneous melt. It was determined upon repetition of this procedure that a post-charging of sodium or $Na_2S_4$ is necessary only infrequently.

In order to remove the reaction product obtained thereby, the removal tube of the reactor was lowered through the packing box until a height of approximately 3–4 cm over the bottom of the reactor was reached. The shank of the tube extended freely over the reactor and was heated by an electric band to approximtely 600° C. Then the reactor was partially emptied after opening of the tube by elevating the inner pressure via the argon line. A residual amount of 1.114 kg was retained in the reactor as starting material for the next charge.

The outflowing melt (1.432 kg) was trapped in an uncovered, flat, cold pan of 20×30 cm bottom area under an atmosphere of argon and allowed to solidify.

| Calculation of amount - Method II | |
| --- | --- |
| Starting material in receiver (remainder from the precharge according to method I) | = 1.162 kg $Na_2S_2$ |
| Addition of Na | = 0.289 kg Na |
| Addition of $Na_2S_4$ | = 1.095 kg $Na_2S_4$ |
| Production | = 1.384 kg $Na_2S_2$ |
| Product removal | = 1.432 kg $Na_2S_2$* |
| Remainder (starting material for next charge) | = 1.114 kg $Na_2S_2$ |

*Analysis:
41.72% Na (theor. 41.76% Na)
58.26% $S_{molten}$ (theor. 58.24% $S_{molten}$)

METHOD III: Preparation Of $Na_2S_2$ By Means Of The Simultaneous Charging Of Sodium and $Na_2S_4$ The simultaneous charging of sodium and $Na_2S_4$ was carried out in an upright, cylindrical V2A industrial reactor which has been jacketed with a graphite crucible (bottom and side walls) on account of the aggressive melt at the high temperature required of up to 600° C. With an inner width of 56 cm and a height of 80 cm, it was able to receive up to approximately 250 kg melt.

An infinitely variable agitator mechanism was inserted centrally through the reactor cover of V2A and flanged thereto. The cover was provided with further connecting pieces for receiving a sensor for measuring the melt temperature, for receiving the inert gas supply, a chimney with a closable flap for removing the inert gas, and for receiving the tube which could be lowered for removal of finished product and for introducing a specimen-removal device. The free end of the finished-product removal tube ended in an uncovered, flat pan of V2A washed by argon (dimensions 200×90×14 cm) for receiving the $Na_2S_2$ melt produced.

A connecting piece for receiving the sodium nozzle and one for receiving the $Na_2S_4$ nozzle were welded on the cover on an axis on both sides of the agitator shaft. The connecting piece for charging sodium was located at one-half the radius and the connecting piece for charging the polysulfide was located at one-fourth the radius, measured from the central agitator shaft. This had the effect that the polysulfide exiting from the $Na_2S_4$ nozzle (nozzle diameter = 3.35 mm) was sprayed as a full stream into the thrombus area which developed as a result of the circulating melt flow generated by the agitator member. The sodium was charged (nozzle diameter = 2.55 mm) outside the thrombus area of the melt in the reaction vessel; i.e. in the non-thrombus area of the melt.

A storage container (V2A, 60 liters) for sodium and one for $Na_2S_4$ (V2A with $AlMg_3$ jacketing, 95 liters) with connected dosing vessels for receiving the two reactants sodium and polysulfide were located above the reactor.

The volumes of these vessels were dimensioned so that 2.180 kg sodium and 8.260 kg $Na_2S_4$ (stoichiometry) were able to be charged into the reactor via the jet nozzles with the aid of argon per working cycle as partial amounts.

The heat-insulated storage containers and dosing vessels were electrically heated, as were the pipelines. In the sodium area, the temperature was adjusted to 130° C. and in the $Na_2S_4$ area it was adjusted to 330° C. The reactor was maintained by an electric auxiliary heating means at minimum temperature of 550° C., as was the product-removal tube, which was constantly heat insulated. In order to remove the reaction heat, the reactor heating was turned off and the heat insulation removed.

All apparatus parts contacted by product consisted of the following materials on account of the varying requirements placed on the corrosion resistance: V2A in the sodium area, $AlMg_3$ and $Al_2O_3$ in the $Na_2S_4$ area and graphite, SiC and $Al_2O_3$ in the $Na_2S_2$ area.

In order to prepare the production of $Na_2S_2$, the polysulfide storage vessel was first filled via a filling connection with an excess of $Na_2S_4$ pellets (approximately 130 kg) and the solid product melted under an atmosphere of argon. Then, the sodium storage vessel was likewise filled with an excess of liquid sodium (approximately 40 kg) under a cover of argon by setting on and connecting up a transport vessel.

After the melting of the $Na_2S_4$ supply, an exactly measured amount of molten tetrasulfide was transferred via an oscillating line into the associated dosing vessel (8.260 kg) and the dosing vessel for sodium was filled in the same manner (2.180 kg).

Before the first, simultaneous charging of sodium and sodium tetrasulfide into the reactor, which still contained 104.360 kg sodium disulfide maintained in a molten state as a remainder of the previous charge at a temperature of 550° C., the electriic reactor heating was turned off and the insulation removed for a better removal of the reaction heat via the reactor wall. After opening of the chimney flap and a flushihg of the reactor by a slight current of argon (approximately 100 liters/h) and after the setting of an argon pressure of approximately 1 bar on the dosing vessels, first the tetrasulfide and immediately thereafter the sodium were transferred into the reactor via both 3-way valves with the agitator mechanism running (120 rpms).

The total amount of sodium contained in the charging vessel was dosed in approximately 45 sec. and the total amount of tetrasulfide contained in its charging vessel was dosed in approximately 60 sec. under the given conditions in a first cycle. Due to the strongly exothermal reaction at the addition of sodium, the temperature in the reactor rose as a rule by approximately 40° C. to approximately 590° C., and 600° C. was never reached or exceeded. The second cycle was prepared during a cooling-off time of approximately 12-15 minutes, that is, the two dosing vessels were refilled with the two reactants and a new charging was performed after a reactor temperature of approximately 550° C. had been reached. The cycle can be repeated in this manner.

After 14 cycles, a total of 30.520 kg sodium and 115.640 kg sodium tetrasulfide had been brought to reaction within 3½–4 hours and 146.160 kg. sodium disulfide produced therewith.

In order to maintain the melt liquid, the reactor was heat-insulated again and the auxiliary heating turned on. After 2 hours postreaction time for dissolving the sodium monosulfide grit precipitated as an intermediate specimen material for an analysis was removed. This was done by briefly introducing an $AlMg_3$ rod through the provided connection into the melt. It was determined after repetition that a recharging of sodium or sodium tetrasulfide is necessary only infrequently.

In order to transfer the finished product into the pan, the chimney flap was closed and an argon pressure of approximately 0.7 bar was built up in the reactor. The finished product removal tube was introduced only so deeply into the melt that only a partial emptying was possible, so that e.g. 98.250 kg sodium disulfide remained as residue in the reactor as starting material for the next charge. The melt forced off into the pan (152.270 kg $Na_2S_2$) was broken out after having cooled off, comminuted and packed into the steel kegs at 40 kg. per keg.

| Calculation of amount - Method III | | |
| --- | --- | --- |
| Starting material in receiver (remainder from the precharge) | = | 104.360 kg $Na_2S_2$ |
| Addition of Na 14 cycles at 2.180 kg | = | 30.520 kg Na |
| Addition of $Na_2S_4$ 14 cycles at 8.260 kg | = | 115.640 kg $Na_2S_4$ |
| Production | = | 146.160 kg $Na_2S_2$ |
| Product removal | = | 152.270 kg $Na_2S_2$* |
| Remainder (starting material for next charge) | = | 98.250 kg $Na_2S_2$ |

*Analysis:
41.73% Na (theor. 41.76% Na)
58.29% $S_{molten}$ (theor. 58.24% $S_{molten}$)

Further variations and modifications of the invention will be apparent to those skilled in the art from the foregoing and are intended to be encompassed by the claims appended hereto.

We claim:

1. A method of preparing lower sodium polysulfides within a stoichiometric range of $Na_2S_2$ and $Na_2S_3$ from higher sodium polysulfides and sodium in a reaction between higher sodium polysulfide and sodium in a stoichiometric ratio corresponding to the desired polysulfide, the reaction taking place in a melt of a polysulfide placed in a reaction vessel under agitation, comprising charging the higher polysulfide and the sodium simultaneously to said melt in such amounts that the resulting reaction mixture remains in the state of an agitatable suspension; said charging being at spatially separate points in cylindrical reaction vessel so dimensioned that a first zone exists for reaction of sodium and polysulfide melt and a second zone exists for reaction of the higher polysulfide and the polysulfide melt, there being a separation between said first zone for reaction between the sodium and polysulfide melt and the second zone in which the higher polysulfide is added, wherein the addition of the higher polysulfide takes places outside of the first reaction zone and in the agitated flow in front of the addition point for the sodium and whereby the agitation is continued until the polysulfide product has been completely formed, wherein said polysulfide product is a sodium polysulfide within a stoichiometric range of $Na_2S_2$ to $Na_2S_3$.

2. The method according to claim 1, wherein the temperature of the melt placed in reaction vessel is maintained in a range of 300°-600° C.

3. The method according to claim 1, wherein the temperature of heat is maintained by the speed of the addition of sodium and/or by the removal of heat.

4. The method according to claim 1, wherein during the preparation of $Na_2S_2$ the temperature of the melt in the receiver is 450°-600° C.

5. The method according to claim 1, wherein during the preparation of $Na_2S_3$ the temperature is 350°-400° C.

6. The method according to claim 1, wherein the reaction is carried out in a reactor whose parts which come in contact with the melt for producing $Na_2S_3$ consist of aluminum alloys or glassy carbon and for producing $Na_2S_2$ are fabricated at least in part of glassy carbon, ceramics or graphite.

7. The method according to claim 1, wherein an inert gas is used as the protective gas.

8. The method according to claim 1, wherein the sodium and the higher polysulfide are dosed in as a molten form or in solid form.

9. The method according to claim 1, further comprising charging the sodium to the melt into a circulating flow generated by agitation located centrally in the reactor outside of the thrombus area of agitation and the higher polysulfide is delivered into the thrombus area of agitation as a full jet stream exiting from nozzle means.

10. The method according to claim 1, further comprising employing nozzle means for charging the sodium, and washing said nozzle with the protective gas to protect against sulfur vapors and polysulfide aerosols.

11. The method according to claim 10, wherein a ball valve means whose flowthrough section is a multiple of the diameter of the full sodium jet stream is closed after termination of the delivery of sodium.

* * * * *